(12) United States Patent
Lee et al.

(10) Patent No.: US 11,133,740 B2
(45) Date of Patent: Sep. 28, 2021

(54) STARTUP REGULATOR USING VOLTAGE BUFFER TO STABILIZE POWER SUPPLY VOLTAGE

(71) Applicant: Cypress Semiconductor Corporation, San Jose, CA (US)

(72) Inventors: Myeongseok Lee, Campbell, CA (US); Pavan Kumar Kuchipudi, San Jose, CA (US); Murtuza Lilamwala, San Jose, CA (US); Anup Nayak, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/024,577

(22) Filed: Sep. 17, 2020

(65) Prior Publication Data

US 2021/0194376 A1 Jun. 24, 2021

Related U.S. Application Data

(60) Provisional application No. 62/949,669, filed on Dec. 18, 2019.

(51) Int. Cl.
*H02M 1/36* (2007.01)
*H02M 3/335* (2006.01)
*H02M 1/08* (2006.01)

(52) U.S. Cl.
CPC ......... *H02M 1/36* (2013.01); *H02M 3/33592* (2013.01); *H02M 1/083* (2013.01)

(58) Field of Classification Search
CPC .......... H02M 1/08; H02M 1/083; H02M 1/36; H02M 5/40; H02M 5/42; H02M 7/02; H02M 7/04; H02M 7/043
See application file for complete search history.

(56) References Cited

U.S. PATENT DOCUMENTS

| | | | |
|---|---|---|---|
| 4,686,449 A | 8/1987 | Jeffrey et al. | |
| 5,285,369 A * | 2/1994 | Balakrishnan | H02M 1/36 323/901 |
| 5,812,383 A * | 9/1998 | Majid | H02M 3/33523 363/21.05 |

(Continued)

FOREIGN PATENT DOCUMENTS

EP 2164170 A1 3/2010

OTHER PUBLICATIONS

Rako, Paul, "What's All This JFET Constant-Current Stuff, Anyhow?," ElectonicDesign, May 16, 2019, pp. 1-15; 15 pages.

*Primary Examiner* — Alex Torres-Rivera
*Assistant Examiner* — David A. Singh

(57) ABSTRACT

A system includes a transformer having an auxiliary coil to provide a flyback voltage to a primary side of an alternating current to direct current (AC-DC) converter. A primary side controller includes an auxiliary pin coupled to the transformer and to an external capacitor, the auxiliary pin to receive the flyback voltage after startup. a junction gate field-effect transistor (JFET) coupled to a supply voltage. A first FET is coupled in series between the JFET and the auxiliary pin, the JFET to charge the external capacitor from the supply voltage during startup. One or more depletion region diodes are coupled to a gate of the first FET, the one or more depletion region diodes to bias a voltage of the gate of the first FET to a specific voltage.

17 Claims, 4 Drawing Sheets

(56) References Cited

U.S. PATENT DOCUMENTS

| | | | |
|---|---|---|---|
| 6,917,504 B2 | 7/2005 | Nguyen et al. | |
| 7,746,156 B1 | 6/2010 | Massie et al. | |
| 8,203,377 B2 | 6/2012 | Kelley et al. | |
| 8,294,440 B2 | 10/2012 | Lowe, Jr. | |
| 8,552,698 B2 | 10/2013 | Chow | |
| 8,670,219 B2 | 3/2014 | Disney | |
| 8,861,164 B2 | 10/2014 | Mikolajczak | |
| 9,621,153 B2 | 4/2017 | Ikeda et al. | |
| 2003/0231050 A1 | 12/2003 | Sukup et al. | |
| 2005/0232080 A1* | 10/2005 | Tolciu | G01S 7/526 367/99 |
| 2008/0211476 A1* | 9/2008 | Chow | G05F 1/613 323/303 |
| 2013/0235623 A1* | 9/2013 | Huang | H02M 7/217 363/21.17 |
| 2013/0235627 A1* | 9/2013 | Huang | H02M 1/14 363/44 |
| 2016/0313378 A1* | 10/2016 | Duvjnak | G01R 19/0092 |
| 2016/0359421 A1* | 12/2016 | Lin | H02M 3/33523 |
| 2016/0365797 A1* | 12/2016 | Wu | H02M 3/33507 |
| 2017/0019016 A9* | 1/2017 | Huang | H02M 1/14 |
| 2018/0191341 A1* | 7/2018 | Bartolomeo | H01L 29/78 |
| 2018/0351357 A1* | 12/2018 | Feldtkeller | H02M 7/217 |
| 2019/0020266 A1* | 1/2019 | Chiu | H02M 1/08 |
| 2019/0044449 A1* | 2/2019 | Li | H02M 3/33592 |
| 2020/0168734 A1 | 5/2020 | Achiriloaie et al. | |

* cited by examiner

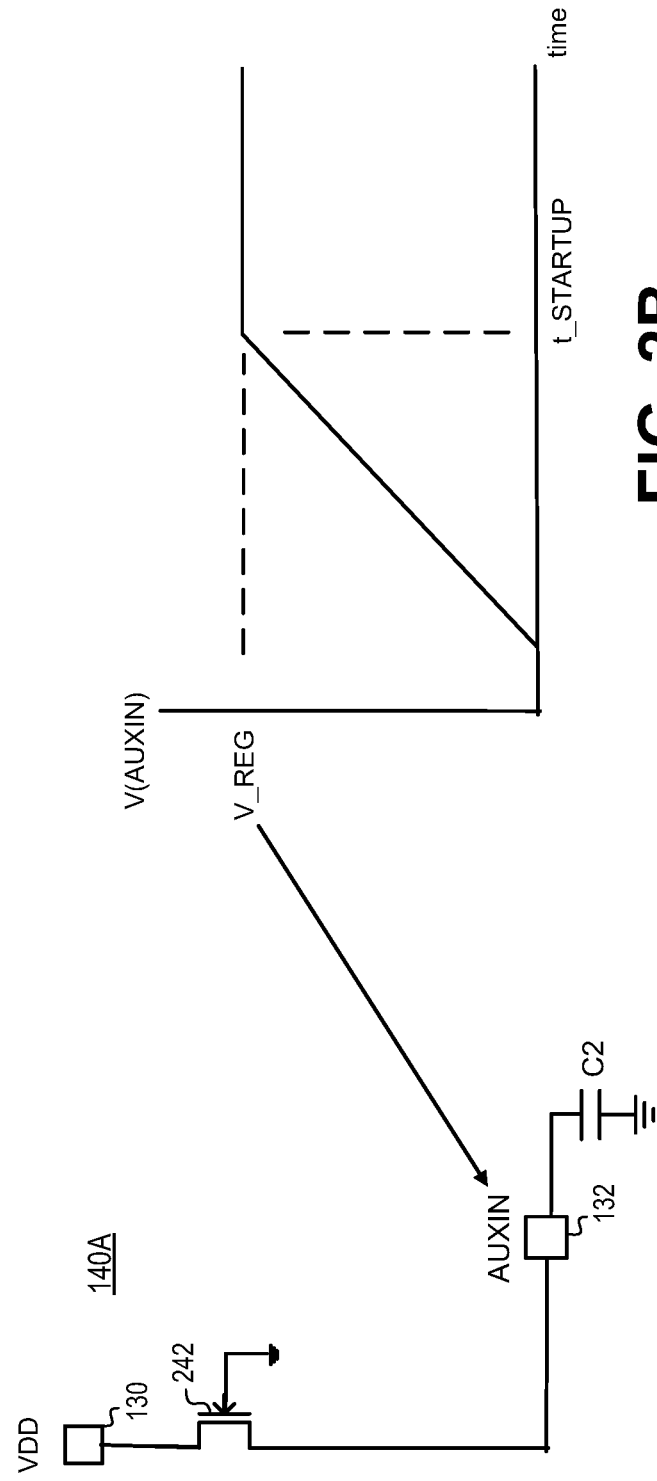

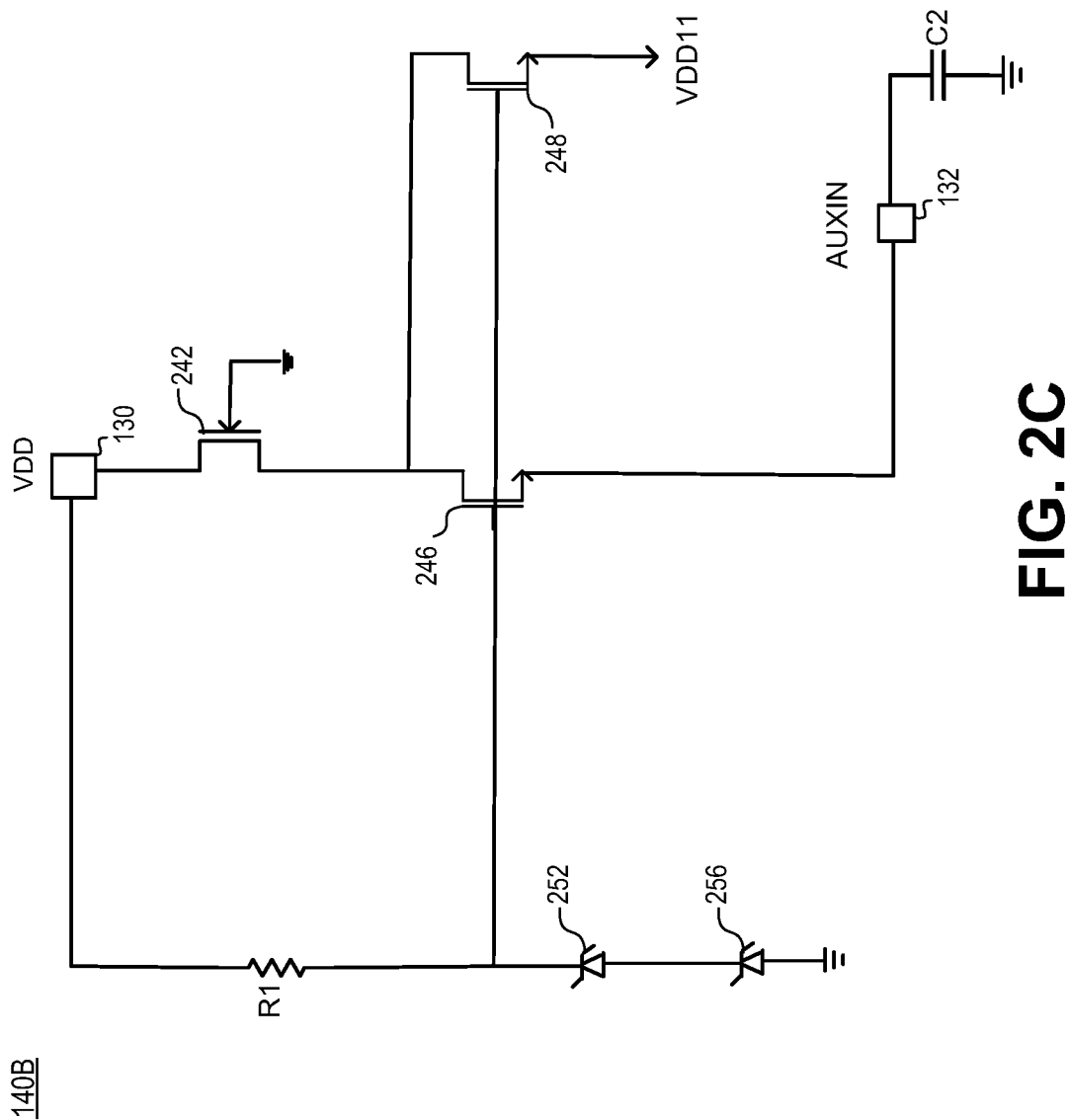

STARTUP REGULATOR USING VOLTAGE BUFFER TO STABILIZE POWER SUPPLY VOLTAGE

RELATED APPLICATIONS

This application claims the benefit of priority to U.S. Provisional Patent Application No. 62/949,669, filed Dec. 18, 2019, which is herein incorporated by this references in its entirety.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) at a specified voltage level. These AC-DC converters can be adapted to include USB-PD control that enables manufacturers to build a reliable, efficient, and cost-effective power adapter for a growing USB type-C charger market.

BRIEF DESCRIPTION OF THE DRAWINGS

The disclosure is illustrated by way of example, and not of limitation, in the figures of the accompanying drawings.

FIG. 2A is a simplified schematic block diagram of a startup regulator of the primary side controller according to one embodiment.

FIG. 2B is a graph illustrating an ideal startup voltage (V_REG) at an auxiliary pin (AUXIN) according to one embodiment.

FIG. 2C is a schematic block diagram of the startup regulator of the primary side controller according to another embodiment.

DETAILED DESCRIPTION

Figure 1:
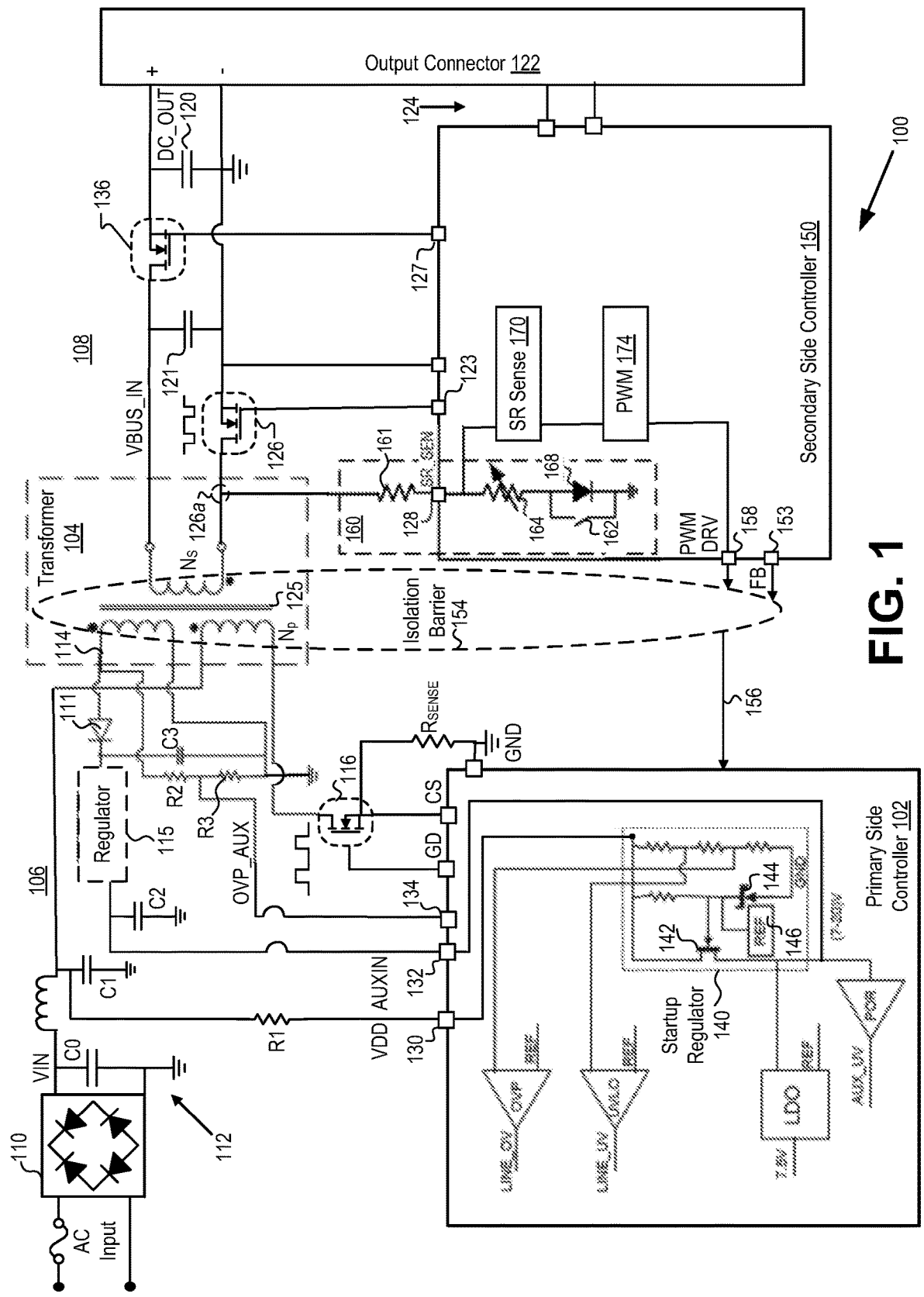
FIG. 1 is a schematic block diagram of an AC-DC converter in which a primary side controller includes a startup regulator to regulate power to the primary side during startup according to various embodiments.

The following description sets forth numerous specific details such as examples of specific systems, components, methods, and so forth, in order to provide a good understanding of various embodiments of the techniques described herein for a startup regulator in an AC-DC converter using a voltage buffer to stabilize a power supply voltage. It will be apparent to one skilled in the art, however, that at least some embodiments can be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations can vary from these exemplary details and still be contemplated to be within the scope of the present disclosure.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which can also be referred to herein as "examples," are described in enough detail to enable those skilled in the art to practice the embodiments of the claimed subject matter described herein. The embodiments can be combined, other embodiments can be utilized, or structural, logical, and electrical changes can be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for a startup regulator in an AC-DC converter using a voltage buffer to stabilize a power supply voltage. For example, the AC-DC converter can include a transformer to step down an input AC voltage from a primary side into an output DC voltage on a secondary side of the AC-DC converter. The output DC voltage can be supplied to a USB Type-C connector for use in charging USB compatible devices, for example. The transformer can include an auxiliary coil that acts as a flyback converter to provide a flyback voltage to the primary side in order to supply voltage to the primary side after startup of the AC-DC converter.

In various embodiments, the startup regulator is included in a primary side controller of the AC-DC converter in order to regulate providing an internal supply voltage to circuitry of the primary side controller during startup. The startup regulator, for example, can include a junction gate field-effect transistor (JFET) that is coupled to a relatively large supply voltage, e.g., between 400-600 volts. This supply voltage can be, for example, a rectified voltage from a bridge rectifier of the AC-DC converter. The JFET is also coupled to an auxiliary pin (AUXIN) of the primary side controller. The auxiliary pin can be coupled to the transformer and to an external capacitor via an auxiliary in line. During startup, the supply voltage charges up the capacitor until the voltage at the auxiliary pin saturates to a predetermined voltage (V_REG) after a predetermined time period. After startup, including receipt of turn-on pulses from a secondary side controller, the primary side controller can instead be powered via the auxiliary pin by the flyback voltage from the transformer.

In these embodiments, the V_REG can be between 10V and 11V, although other voltage thresholds are envisioned, and should remain constant. Because the pinch-off voltage of the JFET varies significantly, e.g., between 11V and 26V, there is a risk that the internal supply voltage at the AUXIN pin exceeds V_REG, which could burnout the auxiliary (or AUXIN) circuitry and/or circuitry of the primary side controller. To ameliorate this risk, use of the JFET alone would require more accurate manufacturing in order to reduce variation and/or use of trimming the JFET, all of which add expense and complexity to the AC-DC converter.

Thus, in some embodiments, the startup regulator is enhanced with a first FET coupled in series between the JFET and the auxiliary pin. Further, one or more depletion region diodes can be coupled between a gate of the first FET and ground. The one or more depletion region diodes can bias a voltage of the gate of the first FET to a specific voltage. Biasing the first FET to a specific voltage enables regulation of the maximum voltage at the auxiliary pin to approximately V_REG, e.g., within safe operation for the auxiliary (or AUXIN) circuitry and the primary side controller. The startup regulator can be further enhanced for safe startup operation and internal power supply generation as will be discussed in more detail. The embodiments described herein can also be implemented in other types of power adapters, power converters, power delivery circuits, or the like.

FIG. 1 is a schematic block diagram of an AC-DC converter 100 in which a primary side controller 102 includes a startup regulator 140 to regulate power to the primary side during startup according to various embodiments. In various embodiments, the AC-DC converter 100 is an apparatus or part of an electronic device that includes charging capability, such as, for example, a laptop power supply, a power outlet with USB type-C connection, a multi-outlet power strip, a wall socket with USB type-C sockets, and the like.

In various embodiments, the AC-DC converter 100 includes a rectifier circuit 112 to receive an AC input from which to generate a rectified voltage, a DC output coupled to an output connector 122 (such as a USB type-C output connector), a transformer 104 coupled between the rectifier circuit 112 and the DC output, a primary side controller 102 coupled to the transformer 104, and a secondary side controller 150 coupled to the transformer 104 and coupled to the primary side controller 102 via a galvanic isolation barrier 154. The transformer 104 can include a primary winding (N) on a primary side 106 electrically connected or coupled to the AC input and a secondary winding (Ns) on a secondary side 108 coupled to the DC output. The transformer 104 can be adapted to step down the rectified voltage to a generate a reduced DC voltage.

In various embodiments, on the primary side 106, the rectifier circuit 112 includes a bridge rectifier 110 and one or more input filters coupled to a first terminal of the transformer 104 to rectify an AC input voltage and supply input power in the form of a rectified output to the primary winding of the transformer 104. In some embodiments, the input filters include, for example, capacitors C0 and C1, one or more diodes, and an RC filter (not all illustrated for simplicity). The AC input can be a set of universal AC main lines having an input voltage of 85 VAC to 265 VAC, for example.

In some embodiments, the AC-DC converter 100 further includes a power switch, such as a primary field effect transistor (FET) 116 having a first or drain node coupled to a second terminal of the transformer 104, a second or gate node coupled to the primary side controller 102, and a third or source node coupled to the primary side controller 102 and, through a current sensing element, such as a resistive element ($R_{SENSE}$) to ground to sense a primary side current flowing through the primary winding when the primary FET 116 is closed or conducting.

The primary side controller 102 can be implemented as an integrated circuit (IC) that is included as a component within the AC-DC converter 100. In various embodiments, the primary side controller 102 includes a supply voltage pin 130, an auxiliary pin 132, a overvoltage protection pin 134 (OVP_AUX), a gate driver pin (GD), a current sense pin (CS), and a ground pin (GND). The primary side 106 can further include a resistive line (e.g., having one or more input resistor R1) coupled between the rectified output from the rectifier circuit 112 and the supply voltage pin 130. This rectified output can be a supply voltage (VDD) of between 400V to 600V (e.g., 500V) or similarly high voltage. The supply voltage can initially power the primary side controller 102 during startup, as will be discussed in detail.

In various embodiments, the AC-DC converter 100 further includes an isolation circuit or galvanic isolation barrier 154 to electrically isolate the secondary side 108 from the high AC input voltage present on the primary side 106. Because the transformer 104 is a step down transformer, the transformer 104 is generally considered part of the galvanic isolation barrier 154. For example, the galvanic isolation barrier 154 can include an auxiliary coil 125 of the transformer 104. In one embodiment, the auxiliary coil 125 supplies a flyback winding 114 of the transformer 104 that is to provide a stepped-down voltage as power to the primary side controller 102 via the auxiliary pin 132.

In some embodiments, the flyback winding 114 along with a diode 111 followed by capacitor C3 to ground stores the stepped-down voltage which is then clipped by a bipolar junction transistor (BJT) structure (and/or other circuitry within an optional regulator 115) and then coupled to the auxiliary pin 132. This additional circuitry helps to reduce total power consumption of the AC-DC converter 100 after startup, as the primary side controller 102 can be supplied through the auxiliary pin 132 instead of via the supply voltage (VDD). A resistor divider R2, R3, connected to the OVP_AUX pin 134 of primary side controller 102, is used to sense a reflected voltage of $V_{BUS\_IN}$ on the secondary side 108 via the transformer 104. With this $V_{BUS\_IN}$ signal primary side controller 102 can disable the primary FET 116 using internal circuitry of the primary side controller.

In some embodiments, the primary side controller 102 further includes a startup regulator 140 that is integrated within the IC and that regulates powering the primary side controller 102 during startup, e.g., before the secondary side 108 becomes active and starts sending turn-on pulses to the primary side controller 102. The startup regulator 140, for example, can include a junction gate field-effect transistor (JFET) 142 that has a source coupled to the supply voltage pin 130, which receives the rectified output from the rectifier circuitry 112. A drain of JFET 142 is also coupled to the auxiliary pin 132 of the primary side controller 102. In this way, voltage supplied from the voltage supply pin 130 through the startup regulator 140 is delivered to the auxiliary pin 132 to power auxiliary circuitry and the primary side controller 102 during startup.

In some embodiments, the startup regulator 140 further includes a depletion region diode 144, such as a Zener diode, coupled between a gate of the of the JFET 142 and ground. Various resistors can also be coupled between the supply voltage pin 130 and ground to, together with the depletion region diode 144, bias the gate of the JFET 142 as precisely as possible so as to deliver a constant voltage to the auxiliary pin 132. These resistors can also function as voltage dividers to supply inputs into auxiliary circuitry comparators for fault detection. The gate of the JFET 142 can also supply a reference voltage 146 (REF) as the reference input to these comparators. Further, the auxiliary pin 132 can be coupled not only to the transformer 104 (e.g., the flyback winding 114), but also to an external capacitor (C2). During startup, the supply voltage charges up the external capacitor, C2, until the voltage at the auxiliary pin 132 saturates to a predetermined voltage (V_REG) after a predetermined time period, as illustrated in FIG. 2B.

In the illustrated embodiments, the primary side controller 102 further includes various fault protection circuitry with inputs received from the reference voltage 146 and other locations within the startup regulator 140. This circuitry includes, for example, comparators to generate faults for line under-voltage lock-out (UVLO), line overvoltage protection (OVP) during soft start, power-on reset (POR) to generate an auxiliary under-voltage (AUX_UV) signal, and a low-dropout voltage (LDO) block to generate, for example, 7.5V for internal power supply.

On the secondary side 108, the AC-DC converter 100 includes a filter capacitor 121 coupled between a third terminal of the transformer 104 and an electrical ground or ground terminal, and an output capacitor 120 coupled between the third terminal of the transformer 104 and an electrical ground to provide a DC output voltage to an output interface or the output connector 122. The output connector 122 can further be coupled to the secondary side controller 102 through a number of communication channels 124 to support various charging protocols. Suitable output connectors 122 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 100 is compliant with the USB protocol to provide a DC output voltage of about 3.3 VDC to about 21.5 VDC at a current of from about 0 to about 5000 milliamps (mA).

In various embodiments, the AC-DC converter 100 further includes, on the secondary side 108, a synchronous rectifier such as a synchronous rectifier (SR) FET 126, coupled between a fourth terminal of the transformer 104 and the ground terminal of the DC output. The SR FET 126 includes a first or drain node coupled to the fourth terminal of the transformer 104 and the secondary side controller 150 to sense a voltage on the drain of the SR FET 126; a second or gate node coupled to the secondary side controller 150 to drive or control the SR FET 126; and a third or source node coupled to the secondary side controller and the ground terminal of the DC output. The gate node of the SR FET 126 can be coupled to an SR-drive pin 123 of the secondary side controller 150.

Optionally, as in the embodiment shown, the secondary side 108 further includes an additional or secondary switch 136, such as an NFET, coupled between the third terminal of the transformer 104 and a positive DC output to enable the secondary side controller 150 to turn off the DC output to protect against over voltage and/or under voltage conditions. The secondary switch 136 includes a source node coupled to a voltage bus in pin ($V_{BUS\_IN}$) of the secondary side controller 150; a gate node coupled to a voltage bus control pin ($V_{BUS\_CTRL}$) 127 to drive or control the secondary switch 136; and a drain node coupled to a voltage bus out pin ($V_{BUS\_OUT}$) and to the positive terminal of the DC output. (Not all pins illustrated.)

In corresponding embodiments, when the primary side power switch (e.g., the primary FET 116) is closed, the primary side 106 of the transformer 104 is connected to the input voltage source. In this embodiment, the primary side 106 of the transformer 104 is coupled to the bridge rectifier 110. As the primary current and magnetic flux in the transformer 104 increases, energy is stored in the transformer core of the transformer 104. The voltage induced in the secondary winding is negative and blocked by the secondary side power switch (e.g., the SR FET 126). When the primary FET 116 is opened, the primary current and magnetic flux drop. The secondary voltage is positive, allowing current to flow from the transformer 104. The energy stored in the transformer 104 is transferred to an output load, such as a USB charging device. The output capacitor 120 can be used to supply energy to the output load when the primary FET 116 is engaged. Thus, the transformer 104, based on control of the primary FET 116, can store energy and transfer the energy to the output of the AC-DC converter 100.

Additionally where, as in the embodiment shown, the AC-DC converter 100 is a flyback converter in which a control signal 156 is provided to the primary side controller 102 from pins on the secondary side controller 150, such as a feedback pin 153 or pulse width modulation (PWM) drive pin 158, the galvanic isolation barrier 154 can further include additional circuits or elements between the secondary side controller and the primary side controller 102 or the primary FET 116, e.g., to pass additional signals to the primary side controller 102. For example, the primary side controller 102 can be configured to receive a control (or pulse) signal as one or more pulses, via a pulse transformer (not illustrated), from the secondary side controller 150 across the galvanic isolation barrier 154. The pulse signal can be received through a PULSEIN pin of the primary side controller 102. The primary side controller 102 can further include PWM control circuitry (not illustrated) to detect the one or more pulses and appropriately turn on or off the primary FET 116 based on these one or more pulses.

In some embodiments, the secondary side 108 together with the secondary side controller 150 includes sensing circuitry to generate a sense signal in response to voltage detected at the secondary side of the transformer 104. The sense signal is to be sent to the primary side controller 102 to turn on a primary FET 116 of the primary side 106, as will be explained in more detail. More specifically, a drain node 126a of the SR FET 126 is coupled to a single SR sense (SR-SNS) pin 128 of the IC through a voltage divider 160 including circuit elements both internal and external to the IC of the secondary side controller. The voltage that is sensed is passed through SR sense circuitry 170 and PWM circuitry 174 before being sent to the primary side controller 102 via the PWM driving pin 158.

In various embodiments, the voltage divider 160 includes an external resistive element 161, a (variable) internal resistive element 164 and an internal rectifier 168. Although shown schematically as a diode, it will be understood that this need not be the case in every embodiment, and that internal rectifier 168 can be a PN diode (as shown), or alternatively, a synchronous diode or a FET configured or connected to function as a diode. The configuration or placement of the internal rectifier 168, i.e., connected with a cathode to ground, ensures that during negative sensing or zero-crossing operations there is substantially no current flow through the voltage divider 160, thereby allowing the full, undivided negative voltage on the drain node 126a to be coupled to the SR-SNS pin 128. A resistance value of external resistive element 161 is generally fixed by the manufacturer of the AC-DC converter 100 and is selected based on an expected maximum voltage on the drain node 126a based on the maximum AC voltage input, and turn-ratio of the transformer 104 to limit a maximum voltage on the SR_SEN node 128 to enable the secondary side controller 150 to be made with non-high voltage devices, made using standard, low voltage technologies. Suitable values for the resistance of the resistive element 161 are from about 4

KΩ to about 10 KΩ. For example, in one embodiment in which the maximum input voltage after bridge rectifier 110 is 380V and the transformer 104 has a 4:1 turn ratio, and the voltage of 21.5V DC on $V_{BUS\_IN}$, the SR_DRAIN 126a voltage can be 116.5V. The secondary side controller 150 is fabricated using a 20V tolerant technology, and the external resistive element 161 has a resistance of about 10 KΩ and internal resistance of about 2 KΩ to limit the maximum voltage on the drain node 126a to no more than about 11.5V.

Optionally, as in the embodiment shown, the voltage divider 160 further includes a bypass switching element or switch 162 in parallel the internal rectifier 168. The switch 162 is closed during feed-forward (ff) sensing in response to an ff-signal (ff_enable) generated in the secondary side controller 150 upon detection of an increasing or non-zero positive voltage on the drain node 126a, which indicates a feed-forward operation.

The secondary side controller 150 can further include an SR sense circuit 170 coupled to the drain node 126a, e.g., attached to the SR_SEN pin 128. The SR sense circuit 170 can include a zero-crossing detector (ZCD), a negative-sensing (NSN) circuit, a peak-detector (PKD) circuit, and a line-feed-forward (LFF) circuit for sensing a voltage on the drain 226a of the SR 126 to sense or detect a zero-crossing, a negative voltage, a peak (positive) voltage and a feed-forward operation. One or more outputs of the SR sense circuit 170 are coupled to a pulse width modulation (PWM) circuit 174 to provide the signal 156 through the PWM drive pin 158 to the primary side controller 102 to control the primary FET 116. The PWM circuit 174 includes a ramp generator and PWM for generating a signal having a modulated pulse width, and a PWM driver for boosting a voltage or power of the signal to that necessary for driving the primary side controller 102 or the primary FET 116, e.g., via a gate driver of the primary side controller 102.

FIG. 2A is a simplified schematic block diagram of a startup regulator 140A of the primary side controller 102 according to one embodiment. The startup regulator 140A, for example, can include a junction gate field-effect transistor (JFET) 242 coupled to the supply voltage pin 130 of a relatively large supply voltage (VDD), e.g., between 400-600 volts. In one embodiment, VDD is 500V, but other supply voltages are envisioned. This supply voltage can be, for example, a rectified voltage from the rectifier circuit 112 of the AC-DC converter 100. In one embodiment, the JFET 242 is the JFET 142 in the primary side controller 102 of FIG. 1. The JFET 242 is also coupled to the auxiliary pin 132 of the primary side controller 102. The auxiliary pin 132 can be coupled to the transformer 104 and to the external capacitor, C2.

In various embodiments during soft startup, the JFET 242 charges up the external capacitor, C2, from the supply voltage until the voltage at the auxiliary pin 132 saturates to a predetermined voltage (V_REG) after a predetermined time period (t_STARTUP). FIG. 2B is a graph illustrating an ideal startup voltage for V_REG at the auxiliary pin 132 according to one embodiment. The soft startup means the voltage at the auxiliary pin 132 slowly ramps up until hitting V_REG, which is maintained thereafter. After startup, including receipt of turn-on pulses from a secondary side controller 150 via the PWM drive pin 158, the primary side controller 102 can instead be powered via the auxiliary pin 132 by the flyback voltage from the flyback winding 114 of the transformer 104.

In these embodiments, the predetermined voltage, V_REG, can be between 10V and 11V, for example, although other voltage thresholds are envisioned to remain generally constant. In one embodiment, V_REG is a constant 11V or within 0.3-0.4V of 11V. Because the pinch-off voltage of the JFET varies significantly, e.g., between 11V and 26V, there is a risk that the internal supply voltage at the AUXIN pin exceeds V_REG, which could burnout the auxiliary (or AUXIN) circuitry and/or circuitry of the primary side controller.

FIG. 2C is a schematic block diagram of a startup regulator 140B of the primary side controller 201 according to another embodiment. In the embodiment of FIG. 2C, the startup regulator 140 further includes a first field effect transistor (FET) 246 coupled in series between the JFET 242 and the auxiliary pin 132. For example, the first FET 246 can be an n-type FET with its drain coupled to the source of the JFET 242 and its source coupled to the auxiliary pin 132. The JFET 242 can still charge the external capacitor, C2, from the supply voltage (VDD) during startup. The startup regulator 140B can further include one or more depletion region diodes coupled to a gate of the first FET 246, e.g., to prevent arching of the high voltage level of the supply voltage (VDD). For example, the one or more depletion region diodes can be one or more Zener diodes (e.g., two Zener diodes), including a first Zener diode 252 and a second Zener diode 256 connected in series between a gate of the first FET 246 and ground.

In various embodiments, the one or more depletion region diodes are to bias a voltage of the gate of the first FET 246 to a specific voltage. In one embodiment, the specific voltage is 12V so that, after a drop of the gate-to-source voltage (Vgs) of the first FET 246, the voltage at the auxiliary pin 132 is biased to 11.3V, which is acceptably close to 11V for a constant V_REG at the auxiliary pin 132. In other embodiments, another specific voltage is chosen (such as 11V or 13V) for a different V_REG as illustrated in FIG. 2B, depending on design of the auxiliary circuitry. Further, the startup regulator 140B can further include one or more resistor, R1, coupled between the supply voltage pin and both the gate of the first FET 246 and the one or more depletion region diodes.

In the embodiment of FIG. 2C, the startup regulator 140B can further include a second FET 248 coupled in parallel to the first FET. In this embodiment, gates of the first FET 246 and the second FET 248 are coupled together and drains of the first FET 246 and the second FET 248 are coupled together. A source of the second FET 248 can then supply an internal supply voltage (VDD11), which in one embodiment, can be about 11V. Accordingly, specific values as recited herein are exemplary and others are envisioned.

Figure 2D:
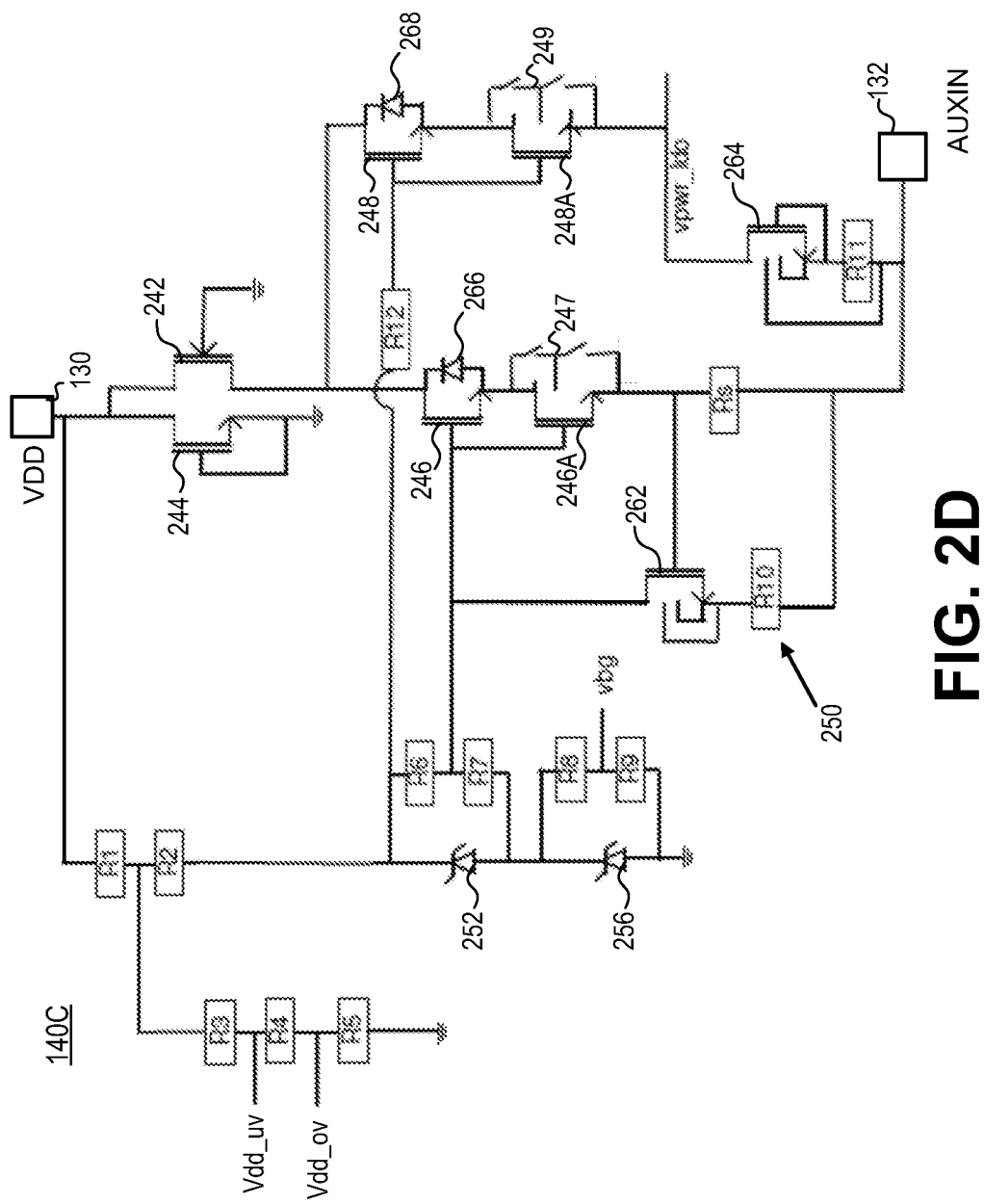
FIG. 2D is a schematic block diagram of the startup regulator of the primary side controller according to a more detailed embodiment.

FIG. 2D is a schematic block diagram of the startup regulator 140C of the primary side controller 102 according to a more detailed embodiment. In the embodiment of FIG. 2D, additional circuitry is added to the startup regulator 140B to provide current limiting and additional voltage clamping. For example, the startup regulator 140C further includes a drain-coupled FET 244 having a gate coupled to a source thereof, where the source and the gate are coupled to ground. A drain of the drain FET 244 is coupled to a drain of the JFET 242. The drain-coupled FET 244 acts as a current limiter to the JFET 242.

Further, resistor R1 in the startup regular 140B can include resistors R1 and R2, which provide a voltage divider to provide a divided voltage to a further voltage divider of resistors R3, R4, R5. The resistors R3, R4, R5 provide voltage tap points for inputs into comparators for undervoltage (Vdd_uv) and overvoltage (Vdd_ov). Additionally, the first Zener diode 252 can be coupled to resistors R6 and R7 connected across anode and cathode terminals and the second Zener diode 256 can be coupled to resistors R8 and R9 connected across anode and cathode terminals. Thus, a resistor is positioned between each of the one or more Zener diodes 252 and 256 and the gate of the first FET 246.

In various embodiments, the startup regulator 140C further includes a third FET 246A coupled in series to the first FET 246 with gates mutually connected, e.g., in the case an additional Vgs voltage drop is desired from the third FET 246A. The source of the first FET 246 can be coupled to a drain of the third FET 246A, with a set of switches 247 allowing the bypass of the third FET 246A, which is therefore optional. The startup regulator can further include a fourth FET 248A coupled in series to the second FET 248 with gates mutually connected, e.g., in the case an additional Vgs voltage drop is desired form the fourth FET 248A. The source of the second FET 248 can be coupled to a drain of the fourth FET 248A, with a set of switches 249 allowing the bypass of the fourth FET 248A, which is therefore optional.

In some embodiments, the startup regulator 140C further includes a current limiter 250 coupled between the one or more depletion region diodes, the first FET 246, and the auxiliary pin 132 to limit a current flowing through the first FET 246. For example, the current limiter 250 can limit the current flowing through the first FET 246 to 10 milliamps, to help protect the circuitry of the startup regulator 140C from burning out from the high voltage supply (VDD).

In one embodiment, the current limiter 250 includes a first isolated metal-oxide-semiconductor FET (MOSFET) 262 having a drain coupled to the one or more depletion region diodes and to the gate of the first FET 246, and a resistor, R10, coupled between a source of the first MOSFET 262 and a source of the first FET 246. In an alternative embodiment, the source of the first MOSFET 262 is coupled to the source of the third FET 246A, if the third FET 246A is present and not bypassed. A further source resistor, Rs, can be coupled between the gate of the first MOSFET 262 and the auxiliary pin 132.

In some embodiments, the startup regulator 140C further includes a second MOSFET 264 having a gate coupled to a source thereof, and a drain of the second MOSFET 264 coupled to the source of the second FET 248. In an alternative embodiment, the source of the second FET 248 is coupled to the source of the fourth FET 248A, if the fourth FET 248A is present and not bypassed. A resistor R11 can be coupled between the source of the second MOSFET 264 and the auxiliary pin 132. In this embodiment, the drain of the second MOSFET 264 supplies a low dropout voltage (VDO) as an internal supply voltage to the auxiliary circuitry and to other circuitry of the primary side controller 102.

In these embodiments, these MOSFETs 262 and 264 are isolated n-type MOSFETs that are inside a deep n-type well (N-well). The drain and source of each isolated MOSFET can be located inside a p-type well (P-well) which is inside of the N-well, all of which can be inside a of a p-type substrate. These MOSFETs are therefore adapted for high voltage current limiting applications.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "sending," "comparing," "maintaining," "switching," "controlling," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:
1. A system comprising:
a transformer comprising an auxiliary coil to provide a flyback voltage to a primary side of an alternating current to direct current (AC-DC) converter; and
a primary side controller comprising:
an auxiliary pin coupled to the transformer and to an external capacitor, the auxiliary pin to receive the flyback voltage after startup;
a junction gate field-effect transistor (JFET) coupled to a supply voltage;

a first FET coupled in series between the JFET and the auxiliary pin, wherein the JFET is to charge the external capacitor from the supply voltage during startup;

one or more depletion region diodes coupled to a gate of the first FET, the one or more depletion region diodes to bias a voltage of the gate of the first FET to a specific voltage;

a second FET having a gate directly connected to a source thereof, wherein the source and the gate are coupled to ground, and a drain of the second FET is connected to a drain of the JFET; and a secondary side controller, coupled to the transformer and to the primary side controller, and that comprises pulse width modulation circuitry to provide a pulse signal to the primary side controller; and wherein, in response to the pulse signal and to charge on the external capacitor reaching a predetermined voltage, the primary side controller is to be supplied current via the auxiliary pin and not via a supply voltage pin coupled to the supply voltage.

2. The system of claim 1, wherein the one or more depletion region diodes comprise one or more Zener diodes, further comprising a resistor positioned between each of the one or more Zener diodes and the gate of the first FET.

3. The system of claim 1, further comprising:
the supply voltage pin coupled to a drain of the JFET and a rectified output of a set of AC main lines; and
one or more resistors coupled between the supply voltage pin and both the gate of the first FET and the one or more depletion region diodes.

4. The system of claim 1, further comprising a second FET coupled in parallel to the first FET, wherein the one or more depletion region diodes are also coupled to a gate of the second FET, and a source of the second FET is to generate an internal supply voltage.

5. The system of claim 4, further comprising:
an isolated metal-oxide-semiconductor FET (MOSFET) having a gate coupled to a source thereof, wherein a drain of the MOSFET is coupled to the source of the second FET; and
a resistor coupled between the source of the MOSFET and the auxiliary pin.

6. The system of claim 1, further comprising a current limiter coupled between the one or more depletion region diodes, the first FET, and the auxiliary pin to limit a current flowing through the first FET, the current limiter comprising an isolated metal-oxide-semiconductor FET (MOSFET) having a drain coupled to the one or more depletion region diodes and to the gate of the first FET.

7. The system of claim 6, wherein the current limiter further comprises a resistor coupled between a source of the MOSFET and a source of the first FET.

8. An integrated circuit for an alternating current to direct current (AC-DC) converter, the integrated circuit comprising:
a primary side controller comprising:
an auxiliary pin to be coupled to a transformer and to an external capacitor of the AC-DC converter;
a junction gate field-effect transistor (JFET) coupled to a supply voltage pin, which is to receive a supply voltage;
a first FET coupled in series between the JFET and the auxiliary pin, wherein the JFET is to charge the external capacitor from the supply voltage during startup;

a second FET having a gate directly connected to a source of the second FET, wherein the source and the gate of the second FET are coupled to ground, and a drain of the second FET is connected to a drain of the JFET; and one or more depletion region diodes coupled to a gate of the first FET, the one or more depletion region diodes to bias a voltage of the gate of the first FET to a specific voltage.

9. The integrated circuit of claim 8, wherein the one or more depletion region diodes comprise one or more Zener diodes.

10. The integrated circuit of claim 9, wherein the one or more Zener diodes comprise two Zener diodes, further comprising a resistor positioned between each of the two Zener diodes and the gate of the first FET.

11. The integrated circuit of claim 8, further comprising:
a supply voltage pin coupled to a drain of the JFET and a rectified output of a set of AC main lines; and
one or more resistors coupled between the supply voltage pin and both the gate of the first FET and the one or more depletion region diodes.

12. The integrated circuit of claim 8, further comprising a second FET coupled in parallel to the first FET, wherein the one or more depletion region diodes are also coupled to a gate of the second FET, and a source of the second FET is to generate an internal supply voltage.

13. The integrated circuit of claim 12, further comprising:
an isolated metal-oxide-semiconductor FET (MOSFET) having a gate coupled to a source thereof, wherein a drain of the MOSFET is coupled to the source of the second FET; and
a resistor coupled between the source of the MOSFET and the auxiliary pin.

14. The integrated circuit of claim 8, further comprising a current limiter coupled between the one or more depletion region diodes, the first FET, and the auxiliary pin to limit a current flowing through the first FET, wherein the current limiter comprises an isolated metal-oxide-semiconductor FET (MOSFET) having a drain coupled to the one or more depletion region diodes and to the gate of the first FET.

15. The integrated circuit of claim 14, wherein the current limiter further comprises a resistor coupled between a source of the MOSFET and a source of the first FET.

16. An apparatus comprising:
a rectifier circuit to be coupled to an alternating current (AC) input, the rectifier circuit to generate a rectified voltage;
a direct current (DC) output coupled to a universal serial bus (USB) type-C output connector;
a transformer coupled between the rectifier circuit and the DC output, the transformer to step down the rectified voltage to generate a reduced DC voltage, the transformer comprising an auxiliary coil to provide a flyback voltage; and
a primary side controller comprising:
an auxiliary pin coupled to the transformer and to an external capacitor, the auxiliary pin to receive the flyback voltage after startup;
a junction gate field-effect transistor (JFET) coupled to the rectified voltage;
a first FET coupled in series between the JFET and the auxiliary pin, wherein the JFET is to charge the external capacitor from the rectified voltage during startup;
a second FET having a gate directly connected to a source of the second FET, wherein the source and the gate of the second FET are coupled to ground, and a drain of the second FET is connected to a drain of the JFET; and one or more depletion region diodes coupled to a gate of the first FET, the one or more depletion region diodes to bias a voltage of the gate of the first FET to a specific voltage.

17. The apparatus of claim 16, wherein the apparatus is one of a power adapter for a laptop, a power outlet with USB type-C connection, a multi-outlet power strip, or a wall socket with USB type-C sockets.

* * * * *